Feb. 11, 1958  M. J. SHIELS  2,823,304
VACUUM TUBE SOCKET VOLTAGE TEST DEVICE
Filed Aug. 2, 1955
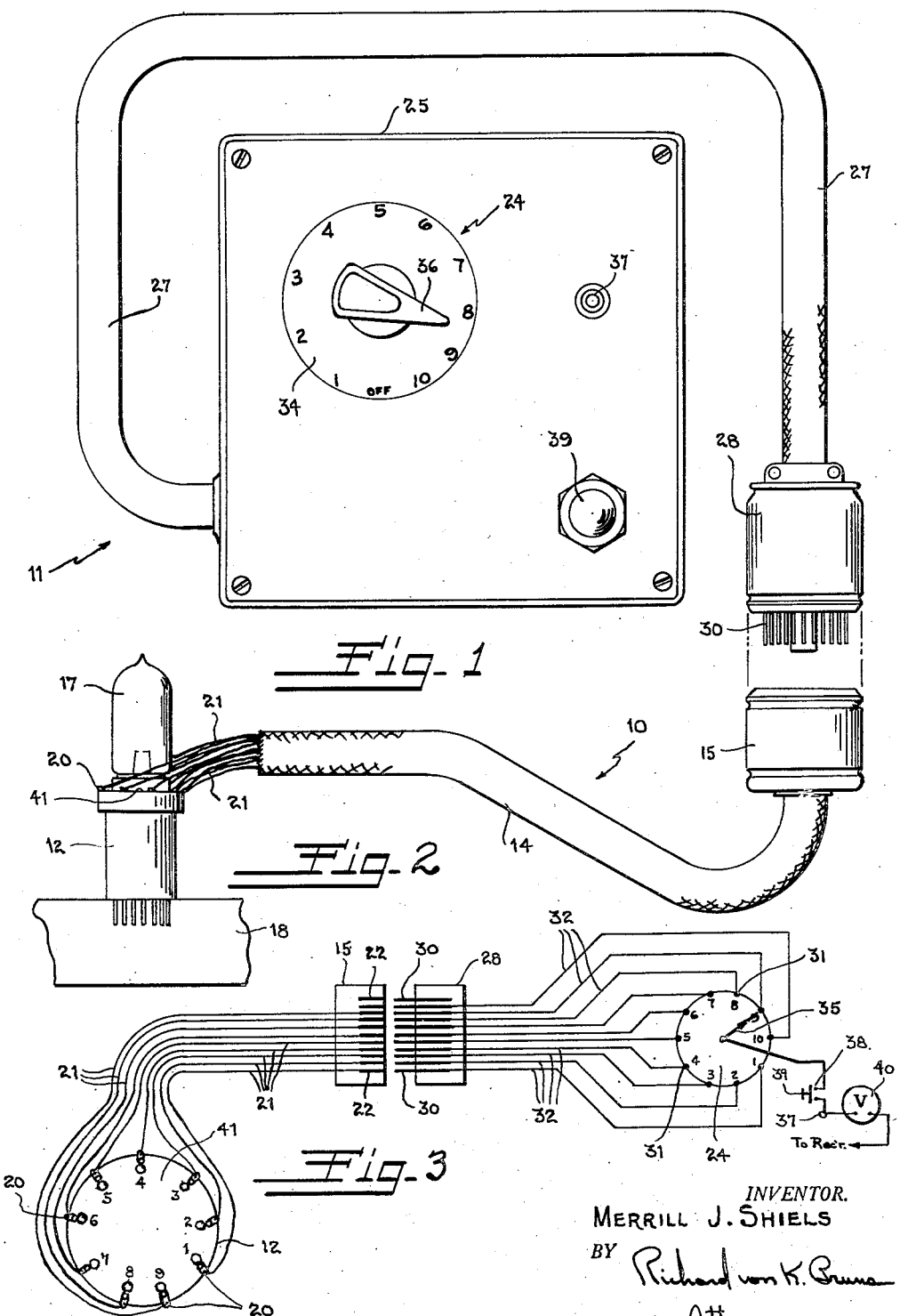
INVENTOR.
MERRILL J. SHIELS
BY Richard von K. Bruns
Attorney

United States Patent Office 2,823,304
Patented Feb. 11, 1958

2,823,304

VACUUM TUBE SOCKET VOLTAGE TEST DEVICE

Merrill J. Shiels, Syracuse, N. Y.

Application August 2, 1955, Serial No. 525,980

6 Claims. (Cl. 250—20)

This invention relates generally to testing equipment for vacuum tube circuits, and has particular reference to an improved device for determining the socket voltages of the various tubes in the circuit.

Testing devices have been developed heretofore for reading the voltages at the different terminals or pins of the vacuum tubes in a radio receiver, or the like. Many of these devices, however, are now obsolete since they were designed for use with tubes having only four or five pins, and those devices which are capable of testing the socket voltages of the new types of tubes are, for the most part, so cumbersome and expensive that they are of little use to the average service man.

As a result of the aforementioned problem, most radio and television service men test tube socket voltages at the present time by means of tube socket voltage test adapters which are interposed between the tube whose pin voltages are being tested and the socket for the tube in radio or television receiver chassis. The adapters are provided with projecting lugs corresponding to each pin on the tube, and the service man checks the voltage at each pin by contacting its lug with a test lead connected to a voltmeter and comparing the reading on the latter with the manufacturer's tube chart. This method, while requiring but a minimum of equipment, has the disadvantage that many of the tubes in the highly complicated radio and television receivers of today are located in almost inaccessible positions so that it is often difficult for the service man to reach and contact the right adapter lug and do so without inadvertently contacting other terminals or parts of the circuit.

In order to eliminate this disadvantage, and permit the testing of vacuum tube socket voltages to be conducted in a more convenient and reliable manner, the present invention contemplates, and has as its primary object, the provision of a time and labor saving testing device which enables the actual contact between the vacuum tube terminal and voltmeter to be made at a point conveniently removed from the immediate area of the radio or television receiver, and insures that the reading taken will be for the tube terminal it is desired to check, and no other. In accordance with the invention, the device is preferably comprised of a plurality of adapters for different types of vacuum tubes each of which is connected by a cable to a female cable connector, and a single rotary type selector switch connected by a cable to a single male cable connector complemental to each of the female connectors. The switch taps are numbered to correspond to the terminals or pins on the tubes, and the movable contact arm thereof is adapted to be connected to one post of a voltmeter, the other post of which is connected to the common ground on the receiver chassis. When the male cable connector is engaged with any one of the female connectors, the adapter terminals are automatically connected to corresponding taps on the switch so that the latter can be selectively operated to obtain the desired readings on the voltmeter.

In addition, to the broad objective stated above, another important object of the invention is to provide a testing device of the above type wherein the tubes whose terminal voltages are being tested are separated from their sockets in the receiver chassis by the test adapters only, and need not be removed to a test unit remote from the receiver.

A further important object of the invention is to provide a testing device of the above type which is adapted for use with all types of modern radio and television receiver tubes, and similar tubes in other types of circuits.

Still another important object of the invention is to provide a vacuum tube socket voltage testing device which is safe, reliable and easy to operate.

A still further important object of the invention is to provide a vacuum tube socket voltage testing device having a simplified, easily transportable construction which is inexpensive to manufacture.

Other objects and advantages of the invention will become apparent from the following detailed description thereof read in conjunction with the accompanying drawings which illustrate a typical embodiment of the invention for the purpose of disclosure.

In the drawings:

Figure 1 is a plan view of the selector switch portion of the testing device embodying the invention;

Figure 2 is a side elevation of one of the adapter portions of the testing device; and Figure 3 is a diagrammatic illustration showing the operative relationship of the two portions of the testing device.

Having reference now to the drawings, wherein like reference numbers designate the same part in each of the views, the vacuum tube socket voltage testing device disclosed herein is essentially comprised of a plurality of adapter portions 10, only one of which is shown, and a single selector switch portion 11 adapted to coact with any one of the adapter portions to enable the voltage readings to be taken. Each adapter portion 10 includes a conventional tube socket voltage test adapter 12, such test adapters being commercially available at the present time for every type of vacuum tube commonly used in radio and television receivers. Accordingly, an adapter portion 10 is provided for each of the different available test adapters and, in accordance with the invention, each of these adapter portions also includes an insulated cable 14 which is secured at one end to the adapter and terminates at the other end in a female or socket type cable connector 15.

Each of the test adapters 12 can be incorporated in the receiver circuit in the conventional manner so that it is positioned between the tube 17 to be tested and the tube socket in the receiver chassis 18; and all of the adapters are provided with the usual projecting test lugs 20 which are numbered to correspond to the terminals or pins of the tube plugged into the adapter, and respectively make electrical contact therewith. Cable 14 encloses at least as many electrical conductors 21 as there are lugs 20 on the test adapter, and these conductors respectively connect the lugs with correspondingly numbered terminals 22 in the cable connector 15. Cable 14 is preferably a foot or more in length so that the connector 15 will be spaced from the receiver chassis to facilitate testing as will hereinafter be more fully described.

As noted hereinabove, the invention contemplates the provision of an adapter portion 10 for each type of test adapter. However, all of the cable connectors 15 for the adapter portions are identical regardless of the number of terminals on the various adapters. This is possible due to the fact that the cable connectors provided all have a greater number of terminals than the highest number of terminals on any test adapter so that not all of the connector terminals will be utilized in the normal case. In the illustrated embodiment of the invention, the connector 15 is shown as having eleven terminals or pin sockets 22 of which no more than nine would normally be employed in connecting a test adapter thereto.

The selector switch portion 11 of the testing device comprises a rotary type selector switch 24 mounted in a suitable housing 25, and an insulated cable 27 connected at one end to the switch and terminating at the other end in a male or pin type cable connector 28. Cable 27 is preferably approximately two feet in length so that when the portions of the device are assembled there will be at least three feet of cable between the test adapter 12 and the switch housing 25. Connector 28 is complemental to each of the female cable connectors 15, having eleven terminals or pins 30, and is formed with an octal base so that correspondingly numbered terminals of the male and female connectors will always engage when the portions of the device are assembled for testing. The switch 24 is provided with eleven taps 31, and ten of these are respectively connected by electrical conductors 32 in the cable 27 to the correspondingly numbered terminals 30 in the cable connector 28. The eleventh tap is employed as an off position for the switch. The relative positions of the ten wired taps and the off position tap are indicated on the exterior of the switch housing by means of an indicator plate 34 mounted on the top of the housing above the switch.

All of the switch taps 31 are selectively engageable by the rotatable switch arm 35 which can be turned by means of an indicator knob 36 mounted on the indicator plate. The switch arm 35 is electrically connected within the switch housing to a pin jack 37 on the housing, the connection therebetween including a normally open switch 38 which can be closed by means of a manually operable push button 39. The pin jack is adapted to be connected by means of a suitable lead to one post of a voltmeter 40, the other post thereof being connected to the common ground on the receiver. With this arrangement, it will be understood that when the adapter portion 10 for any one of the tubes in the receiver is connected to the switch portion 11, the pins on the tube will be respectively connected to correspondingly numbered taps on the switch, and each tube pin can be selectively connected to the voltmeter by means of the switch arm 35.

In operating the testing device, the user first selects the proper adapter portion 10 for the receiver tube for which the pin voltages are to be tested. Thus, the adapter portion selected might have a four pin large adapter, a seven pin miniature adapter, an eight pin octal adapter, or any one of the various other adapters depending upon the tube type. In the drawings, the tube 17 represents a nine pin tube, and the adapter 12 is a nine pin adapter designed for use therewith. Accordingly, only the first nine terminals on the adapter portion cable connector 15 will be utilized, as shown.

Having selected the proper adapter portion 10, the tube is removed from its socket in the receiver and the adapter is substituted therefor, the tube being plugged into the corresponding adapter socket 41. The adapter portion cable connector 15 is then engaged with the cable connector 28 on the switch portion 11 which can be positioned in a convenient location away from the receiver due to the combined lengths of the cables 14 and 27. In this connection, it should be noted that the female cable connector 15 is located on the "live" or receiver side of the testing device so that even though the receiver is turned on when the connectors are put together, there is little danger of receiving a shock therefrom.

After the two portions of the testing device have been assembled, the nine pins on tube 17 will be directly connected to the first nine taps on switch 24 and the individual pin voltage readings can be taken by successively moving the switch arm 35 into contact with each of the nine taps. The voltmeter 40 has been previously placed in the circuit by connecting its positive and negative posts to the pin jack 37 and the common ground on the receiver chassis respectively, for positive voltage readings, or by reversing those connections for negative voltage readings. Accordingly, when the switch arm is moved into contact with the tap corresponding to one of the pins on the tube, and the push button 39 is operated to close the switch between the arm and the pin jack, the voltmeter will indicate the voltage at the pin and the reading can be compared with the manufacturer's pin voltage chart. The normally open switch 38 between the switch arm and pin jack is provided because, in moving the arm into contact with a particular switch tap, it may be necessary to move it through one or more intermediate positions and some of these might be at higher voltages than the range for which the voltmeter is set. The switch, therefore, prevents possible injury to the voltmeter in such event.

A nine pin vacuum tube as shown in the drawings has the highest number of terminals of any tube in common use today with the exception of television picture tubes which may have as many as twelve terminals. However, as a general rule, only six or seven of the terminals of a picture tube are utilized. Accordingly, the illustrated embodiment of the invention which shows a test device capable of testing tubes having up to ten terminals is more than adequate at the present time, and the off position switch tap can be used in connection with the eleventh terminal on the cable connectors should such become necessary. Additional terminals and corresponding switch taps can, of course, be easily provided in the event that tubes having a larger number of terminals are hereinafter developed and put into common use.

From the foregoing description, it will be apparent that the invention provides a novel and highly useful testing device for vacuum tube socket voltages, the device enabling the user to obtain the voltage readings in an accurate, convenient and safe manner. In addition, the device is of simple, durable construction and is extremely easy to operate so that a material saving in both time and labor is made possible.

The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. Test equipment for vacuum tube circuits comprising an adapter for insertion into a tube socket with the tube therefor inserted in the adapter, a selector switch having a plurality of taps and located at a point remote from said adapter, a plurality of terminals on said adapter corresponding to the pins of the tube inserted therein, a cable having a plurality of electrical conductors each of which is permanently secured at one end to one of the terminals of said adapter and at its other end to a corresponding tap on said switch, said cable having a separable pin and socket connection therein between said adapter and switch, and an electrical measuring instrument electrically connected to the movable arm of said selector switch.

2. Test equipment for vacuum tube circuits comprising an adapter for insertion into a tube socket with the tube therefor inserted in the adapter, the height of said adapter not exceeding that of the tube, a female cable connector, a plurality of terminals on said adapter corresponding to the pins of the tube inserted therein, a first cable having electrical conductors permanently connecting each of the terminals of said adapter to the terminals of said female connector, a male cable connector, a selector switch having a plurality of taps, a second cable having electrical conductors connecting the terminals of said male connector to said switch taps, said female and male connectors being engageable to respectively connect the terminals of said adapter to corresponding taps on said switch, and means associated with said switch to electrically connect the movable arm thereof to an electrical measuring instrument.

3. Equipment as defined in claim 2 wherein said male and female connectors are registering pin and socket connectors respectively.

4. In combination with a vacuum tube adapter insertable into a tube socket in a radio or television receiver with the tube therefor inserted in the adapter, a plurality of terminals on said adapter corresponding to the pins of the tube inserted therein, pin voltage testing means comprising a female cable connector having as many terminals as the terminals on said adapter, electrical conductors respectively connecting the adapter terminals to correspondingly numbered terminals on said female connector, a male cable connector engageable with said female cable connector and having an equal number of terminals, a rotary selector switch having at least as many taps as the terminals of said female connector, electrical conductors respectively connecting the terminals of said male connector to corresponding terminals on said switch, and means to electrically connect the movable arm of said switch to a voltmeter.

5. In a pin voltage testing device for vacuum tubes in radio or television receivers, an adapter insertable into a tube socket in the receiver chassis and having a corresponding socket for the receipt of the tube normally positioned in the receiver socket, the height of said adapter not exceeding that of the tube, a plurality of outwardly projecting lugs on said adapter respectively connected electrically to the pins of the tube when the latter is inserted into the adapter, a socket type cable connector, a first cable having electrical conductors respectively connecting said adapter lugs to corresponding terminals in said socket connector, a pin type cable connector complemental to said socket connector, a rotary selector switch having a rotatable selector arm and a plurality of taps numbered to correspond to the pin numbers of the tubes in the receiver, a second cable having electrical conductors respectively connecting the terminals of said pin connector to corresponding taps on said switch, said socket and pin connectors being engageable to electrically connect the pins of a tube inserted into the adapter with correspondingly numbered taps on said switch, a voltmeter one post of which is connected to the common ground on the receiver chassis, means to electrically connect said switch selector arm to the other post on said voltmeter, a normally open switch in said last-named connecting means, and manually operable means to close said switch when said selector arm is moved into contact with one of said switch taps to read on the voltmeter the pin voltage of the tube pin connected to the tap.

6. In a testing device for vacuum tube circuits including various different adapters for use with tubes having a varying number of pins, each of said adapters having a height and diameter approximately equal to that of the tubes, a female cable connector for each adapter, all of said connectors being identical and having at least as many terminals as the highest number of pins on any tube in the circuit, the terminals of each adapter being respectively electrically connected to the corresponding terminals of its connector, a single selector switch remote from said tube circuit and having at least as many taps as said female connectors, said taps being numbered to correspond to the pin numbers of the tubes in the circuit, and a single male cable connector having the same number of terminals as said female connectors and being complemental to any one of said female connectors, the terminals of said male connector being respectively electrically connected to corresponding taps on said selector switch.

References Cited in the file of this patent

UNITED STATES PATENTS

| | | |
|---|---|---|
| 1,974,391 | Hoover | Sept. 18, 1934 |
| 1,976,021 | Hollerith | Oct. 9, 1934 |
| 2,088,355 | Wehming | July 27, 1937 |
| 2,221,556 | Roemisch | Nov. 12, 1940 |
| 2,578,288 | Cook | Dec. 11, 1951 |

FOREIGN PATENTS

| | | |
|---|---|---|
| 695,292 | Great Britain | Aug. 5, 1953 |